United States Patent
Junius et al.

(10) Patent No.: US 9,290,832 B2
(45) Date of Patent: Mar. 22, 2016

(54) MICRO-ALLOYED CARBON STEEL AS A TEXTURE-ROLLED STRIP STEEL, IN PARTICULAR FOR SPRING ELEMENTS

(75) Inventors: Hans-Toni Junius, Schwerte (DE); Heino Buddenberg, Wetter (DE); Michael Hellmann, Hemer (DE); Dirk Wilmes, Iserlohn (DE)

(73) Assignee: C.D. Waelzholz GmbH, Hagen (DE)

( * ) Notice: Subject to any disclaimer, the term of this patent is extended or adjusted under 35 U.S.C. 154(b) by 0 days.

(21) Appl. No.: 13/138,457

(22) PCT Filed: Feb. 25, 2010

(86) PCT No.: PCT/DE2010/000225
§ 371 (c)(1),
(2), (4) Date: Sep. 28, 2011

(87) PCT Pub. No.: WO2010/097078
PCT Pub. Date: Sep. 2, 2010

(65) Prior Publication Data
US 2012/0114519 A1 May 10, 2012

(30) Foreign Application Priority Data
Feb. 26, 2009 (DE) .................. 10 2009 010 442

(51) Int. Cl.
C22C 38/04 (2006.01)
C22C 38/14 (2006.01)
C22C 38/12 (2006.01)
C21D 7/02 (2006.01)
C21D 9/02 (2006.01)
F16F 1/02 (2006.01)

(52) U.S. Cl.
CPC . *C22C 38/04* (2013.01); *C21D 9/02* (2013.01); *F16F 1/021* (2013.01)

(58) Field of Classification Search
USPC .......... 148/320, 598, 599, 650; 420/124–128
See application file for complete search history.

(56) References Cited

U.S. PATENT DOCUMENTS 3,668,020 A * 6/1972 Lucht

FOREIGN PATENT DOCUMENTS

| EP | 1 018 565 | 7/2000 |
|---|---|---|
| EP | 1 589 124 | 10/2005 |
| EP | 1 865 079 | 12/2007 |
| JP | H04116137 A | 4/1992 |
| JP | H1088237 A | 4/1998 |
| JP | 2001-181788 | 7/2001 |
| WO | WO 2008/150056 | 12/2008 |

OTHER PUBLICATIONS

English abstract of Russian patent 1555377A, Dementienk A V, et al, , Apr. 7, 1990.*
International Search Report of PCT/DE2010/000225, Oct. 28, 2010.

* cited by examiner

*Primary Examiner* — Deborah Yee
(74) *Attorney, Agent, or Firm* — Collard & Roe, P.C.

(57) ABSTRACT

The invention relates to a cold-rolled carbon steel comprising (in % by weight) C 0.63-0.85%, max. 0.40% Si, 0.20-0.90% Mn, max. 0.035% P, max. 0.035% S, max. 0.060% Al, max. 0.40% Cr, 0.003-0.010% N, preferably 0.005-0.008%, and a maximum of 0.12% of at least one micro-alloying element, the remainder being iron and steel production-related pollutants. Possible micro-alloying elements are Ti, Nb, V and optionally Zr. A carbon steel of the type is cold-rolled into texture-rolled strip steel with a high cold reduction degree and can be used in particular as a material for coiling springs or other components having spring properties.

12 Claims, 1 Drawing Sheet

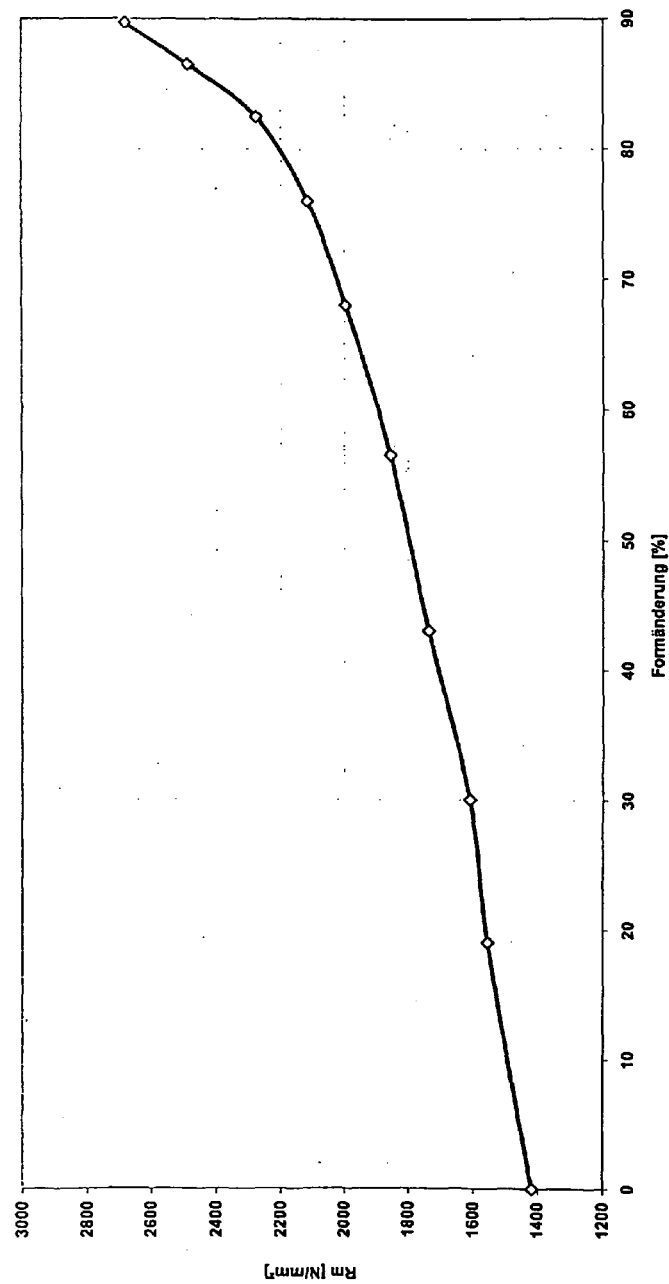

MICRO-ALLOYED CARBON STEEL AS A TEXTURE-ROLLED STRIP STEEL, IN PARTICULAR FOR SPRING ELEMENTS

CROSS REFERENCE TO RELATED APPLICATIONS

This application is the National Stage of PCT/DE2010/000225 filed on Feb. 25, 2010, which claims priority under 35 U.S.C. §119 of German Application No. 10 2009 010 442.9 filed on Feb. 26, 2009, the disclosure of which is incorporated by reference. The international application under PCT article 21(2) was not published in English.

BACKGROUND OF THE INVENTION

1. Field of the Invention

The invention relates to a carbon steel as a texture-rolled strip steel, in particular for springs.

2. Description of the Related Art

Strip steel is frequently used, in technical areas of use, for the production of spring material, in particular also of springs that can be rolled up. Such springs are used, for example, in motor vehicle safety belts, as material for tape measures that can be rolled up, as cable roll-ups, or also as a roll-up element of dog leashes and in many other applications.

In the state of the art, the production of such roll-up springs is undertaken proceeding from the product of wire or strip, usually by means of conventional annealing of a strip steel on the basis of martensite, or by means of isothermal conversion to a fine-striped, pearlitic structure, with subsequent cold forming (so-called texture-rolled strip steel). For this purpose, unalloyed steels are typically used. In this connection, texture-rolled strip steel is understood to mean all strip steels and, in particular, spring strip steels, which have a clearly marked texture, i.e. a crystal orientation, in the final state. This crystal orientation brings about an improvement in the spring properties and a reduction in the fracture risk due to corrosion or mechanical damage crosswise to the crystal orientation. Usually, such a texture is produced by means of strong cold forming of the material by means of rolling, or also by means of drawing, without intermediate annealing.

The pre-rolled strip (for example having a thickness of 1.5 mm) is first austenitized (the carbon is brought into solution) at approximately 850° C., in an annealing system that operates continuously, then quenched in a lead bath at about 450 to 500° C., and held there until the isothermal conversion has completely taken place. The fine-lamellar pearlite structure that occurs in this connection is called sorbite, after the English inventor, or patenting structure. A good patenting structure has a lamellar distance of about 0.1 μm. The patenting strength is all the greater, the more fine-striped the sorbite and the less the distance between the cementite lamellae.

During the subsequent cold-rolling, which is predominantly carried out in reversing manner, significant deformations occur both in the ferrite lamellae and the cementite lamellae of the pearlite. In structure regions where the lamellae are disposed parallel to the rolling direction, the lamella distance is reduced as the result of the deformation. In contrast, in structure regions that lie perpendicular to the rolling direction, the lamellae are at first bent in wave shape, and, when greater shape changes occur, actually in hair-needle shape. A pure fiber structure is present as soon as all of the structure regions have disposed themselves to be parallel to the rolling direction, aside from the bending points.

This complicated and complex production process can be explained as follows in terms of metallurgy. During the deformation, the steel is subject to restrictions, since it must be deformed as a whole, without breaking down into individual grains. As a result, every grain must participate in the deformation, and every grain must coordinate this deformation with its adjacent grain, in order to allow cohesion along their grain boundaries. However, the grains of the strip steel have different orientations. If these have an external stress applied to them as the result of the rolling process, then those grains that have advantageously oriented slide systems, in other words a higher Schmid factor (the conversion factor between externally applied tensile and pressure stress $\sigma$ and the shear stress $\tau$ that acts in the slide plane), will already deform while the critical shear stress has not yet been reached in other, less advantageously oriented grains. The deformation of an individual grain therefore leads to a shape change that is not shared by the surroundings, which do not deform plastically. The shape change is elastically suppressed, which can lead to high internal stresses, and finally, as a result, the critical shear stress is also reached in the adjacent grains. Only when all the grains of the strip steel deform plastically is the stretching limit of the material reached.

In addition to the mechanism indicated above, which increases strength, by means of cold rolling, in addition the increase in strength by means of so-called mixed crystal hardening can be used. This is a consequence of the interaction of the alloy atoms with the offsets that leads to hindrance of the interaction. The effect of the foreign atoms can take place in three different ways, in this connection:

Paraelastic interaction: This lattice parameter effect is brought about by means of the different atom size of the foreign atoms, in comparison with the matrix atoms; the installation of the foreign atoms into the crystal lattice causes stresses.

Dielastic interaction: The interaction of this shear modulus effect is based on the fact that the energy of an offset is proportional to the shear modulus G.

Chemical interaction: This mechanism, also called Suzuki effect, is based on the fact that the energy of the stacking defects depends on the composition.

Aside from the structure-technology influence variables, the properties of the thin-walled rolled steel that is relevant here are also decisively influenced by the surface topography. A geometrically ideal, i.e. completely smooth surface cannot be achieved using conventional technical means; instead, a technical surface with defined superimpositions of individual shape deviations (scallop heights and wave depths) is produced. Cold rolling is a bound deformation (flat shape change state). In this connection, the unstraightened surface of the descaled, pickled hot strip is straightened to form a textured strip, with an increasing rolling pass number, as a result of the relative movement between roller and rolled material.

The rolling passes on the special frames flatten the surface of the steel. The decrease in roughness amounts to between 60 and 90%, as a function of the product. It depends on the initial roughness, the roller roughness, as well as on the shape change resistance of the material. With an increasing number of rolling passes, the roughness of the surface approaches a limit value. Variation parameters for setting the required topography are, among others, roller gap geometry, pressure distribution, roller speed, and strip tension. The working roller as the deformation tool exerts a decisive influence on the strip surface, in this connection. Its surface profile changes with the roller travel. The grinding contour of a freshly installed roller is speedily worked off; flattening is particularly intensive at the beginning, and then asymptotically reaches a certain limit value.

With spring steels produced with the observance of the aforementioned production parameters, it is possible to achieve excellent spring properties even at very high stress cycle numbers. These materials are therefore widespread for the special applications described.

However, it has turned out that in the case of spring materials for roll-up springs having only a very slight strip thickness in the most-stressed range, for example in the production of roll-up springs for dog leashes in the thickness spectrum of typically 0.10-0.19 mm strip thickness, the structure components that form in the structure that occurs are not allowed to be larger than about 20 μm and thus smaller than about ⅕ of the strip thickness of the spring steel strip. In the case of larger components or inclusions, a notch effect can otherwise occur at the inclusions or structure components, and this can lead to destruction of the strip steel. Guaranteeing such a fine-grained structure is problematic in connection with the conventional production of corresponding spring materials described above, at the required sheet-metal thicknesses.

SUMMARY OF THE INVENTION

It is therefore the task of the present invention to further develop a cold texture-rolled strip steel of the stated type, in such a manner that it is guaranteed that crack formation by means of a notch effect, due to overly large structure components, is reliably avoided even at very slight strip thicknesses, and the material properties are not impaired, or are actually improved, as compared with known texture-rolled strip steels.

The solution for the task according to the invention is evident from the features discussed below. Further advantageous embodiments of the invention are also discussed below.

The invention proceeds from a cold-rolled carbon steel having (in wt.-%)
C 0.63-0.85%
Si max. 0.40%
Mn 0.20-0.90%
P max. 0.035%
S max. 0.035%
Al max. 0.060%
Cr max. 0.40%
N 0.003-0.010%, preferably 0.005-0.008% at least one micro-alloy element having a content of maximally 0.12%
remainder iron and melt-related contaminants.

BRIEF DESCRIPTION OF THE DRAWINGS

FIG. 1 shows a solidification curve plotted qualitatively for an exemplary composition of the carbon steel according to the invention, as a function of the strip thickness, once for cold-rolled strip steel and once for cold-rolled and annealed strip steel.

DETAILED DESCRIPTION OF THE PREFERRED EMBODIMENT

Structure refinement is achieved by means of the at least one micro-alloy element; this refinement reliably avoids the occurrence of defects in the structure, preventing a notch effect, particularly in connection with use for thin spring strips, whereby at the same time, an increase in strength as well as an improvement in the achievable expansions and thus of the deformability of the material is achieved. Titanium Ti, niobium Nb, or vanadium V, possibly also zirconium Zr, individually or in combination, can be used as micro-alloy elements, whereby the upper limit of the alloy proportion results from the need for binding the finely distributed carbides and nitrides, and the lower limit of the alloy proportion results from the precipitation hardening that occurs. Experiments have shown that the total proportions of the micro-alloy elements should lie between 0.02 and 0.12 weight-percent of the carbon steel, in order to achieve the advantageous structure formation as described.

It is true that in the production of hot-rolled steels, it is already known to add alloy components that bring about a reduction in the grain sizes of the structure that occurs. There, micro-alloy elements are added, by means of which a hot-rolled and subsequently cooled steel forms a fine-grained structure. However, hot rolling is a processing method for larger sheet-metal thicknesses, for example in the range of 250 mm down to about 1 mm sheet-metal thickness. Generally, it is not possible to produce lesser sheet-metal thicknesses using hot rolling, since a thinner sheet cannot be reliably kept at the hot-rolling temperature, generally above 720° C., between the individual rolling passes. The use of such micro-alloyed hot-rolling steels is therefore restricted to steel products having relatively great thickness dimensions. Such micro-alloyed steels for hot-rolling cannot be used for the requirements that exist here, particularly with regard to the notch effect discussed above as well as the required surface properties, because the deformation properties of the structures of hot-rolled steels are different, in broad ranges, as compared with those of cold-rolled steels, and because of the structure changes that occur due to the greater thermal activation during heating and cooling of the hot-rolled steels. Instead, it has surprisingly been shown that steel composed according to the invention, having a fine-lamellar pearlite structure (sorbite), specifically for cold rolling, fulfills the requirements with regard to an increase in strength as well as an improvement in the achievable expansions and thus of the deformability of the material, as well as the usage properties with regard to the stress cycle numbers of spring components produced from it, and the required surface grades, in exemplary manner. Specifically these properties at the required thickness dimensions can be achieved by means of the structure refinement according to the invention, in a qualitatively particularly good and efficient manner.

The final strength of the texture-rolled steel is defined by the sum of annealing strength and deformation stabilization. In this connection, alloy contents of micro-alloy elements having a content up to maximally 0.12 wt.-% are supposed to increase the strength and impact resistance by means of precipitations and grain refinement, and thus to improve the method of functioning and increase the useful lifetime of the springs produced from the material, particularly to make an increase in the stress cycles possible.

The chemical analysis can fundamentally correspond to a standardized and proven steel grade such as the steel grades C60S or C80S or similar steel grades, for example, which are already in use today, but with the addition of vanadium, niobium, or titanium, possibly also zirconium as micro-alloy components, added individually or in total.

Vanadium, similar to niobium and titanium, forms micro-dispersed nitrides, carbides, or carbonitrides in the grains and at the grain boundaries (most effective particle distance: 5-10 nm).

Vanadium can dissolve in the γ range and has the effect of precipitation hardening and grain refinement.

It is furthermore advantageous if the carbon steel is subjected to a cold-rolling process with a cold reduction degree between 60% and 90%, in order to achieve the desired orientation of the structure components.

Such a carbon steel can preferably be used as a material for texture-rolled strip spring steel for the production of roll-up elements for motor vehicle safety belts, for tape measures that can be rolled up, for cable roll-ups, or for roll-up elements of dog leashes, as well as of many different other semi-finished and finished products.

In FIG. 1, the solidification curve is plotted qualitatively for an exemplary composition of the carbon steel according to the invention, as a function of the strip thickness, for cold-rolled strip steel. As can be seen, the strength of the material increases with an increasing cold reduction degree and lies in the range of about 2450 N/mm$^2$ in the range of strip thicknesses of 0.1 mm).

The invention claimed is:

1. Cold-rolled carbon steel, having (in wt.-%)
C 0.63-0.85%,
Si max. 0.40%,
Mn 0.20-0.90%,
P max. 0.035%,
S max. 0.035%,
Al max. 0.060%,
Cr max. 0.40%,
N 0.003-0.010%,
niobium Nb as a micro-alloy element and at least one further micro-alloy element selected from the group consisting of Ti, V, and Zr, the niobium Nb and the at least one further micro-alloy element together having a content of at least 0.02% and maximally 0.12%, remainder iron and melt-related contaminants;
wherein the carbon steel has a tensile strength in the range of 2400-3000 MPa after cold rolling,
wherein the cold-rolled carbon steel is a strip having a thickness of between 0.10 mm and 0.19 mm, and
wherein the cold-rolled carbon steel in the strip is a fine-lamellar pearlite structure.

2. Carbon steel according to claim 1, wherein the at least one further micro-alloy element is titanium Ti.

3. Carbon steel according to claim 1, wherein the at least one further micro-alloy element is vanadium V.

4. Carbon steel according to claim 1, wherein the at least one further micro-alloy element is zirconium Zr.

5. A texture-rolled strip spring steel for the production of a roll-up element for motor vehicle safety belts, for tape measures that can be rolled up, for cable roll-ups, or for roll-up elements of dog leashes, said textile-rolled strip spring steel comprising a cold-rolled carbon steel, having (in wt.-%)
C 0.63-0.85%,
Si max. 0.40%,
Mn 0.20-0.90%,
P max. 0.035%,
S max. 0.035%,
Al max. 0.060%,
Cr max. 0.40%,
N 0.003-0.010%,
niobium Nb as a micro-alloy element and at least one further micro-alloy element selected from the group consisting of Ti, V, and Zr, the niobium Nb and the at least one further micro-alloy element together having a content of at least 0.02% and maximally 0.12%,
remainder iron and melt-related contaminants,
wherein the carbon steel has a tensile strength in the range of 2400-3000 MPa after cold rolling,
wherein the roll-up element has a thickness of between 0.10 mm and 0.19 mm, and
wherein the texture-rolled strip spring steel in the roll-up element is a fine-lamellar pearlite structure.

6. Method for the production of a texture-rolled strip spring steel according to claim 5, comprising a cold-rolling process having a cold reduction degree between 60% and 99%.

7. Carbon steel according to claim 1, wherein the carbon steel is C80 or C80S.

8. Carbon steel according to claim 1, wherein the carbon steel has from 0.005 wt. % to 0.008 wt. % N.

9. Carbon steel according to claim 1, wherein the carbon steel has from 0.05 wt. % to 0.10 wt. % Ti as the at least one further micro-alloy element.

10. Carbon steel according to claim 1, wherein the carbon steel contains from 0.05 wt. % to 0.10 wt. % niobium Nb.

11. Carbon steel according to claim 3, wherein the carbon steel has from 0.08 wt. % to 0.10 wt. % vanadium V as the at least one further micro-alloy element.

12. Carbon steel according to claim 4, wherein the carbon steel has from 0.08 wt. % to 0.10 wt. % zirconium Zr as the at least one further micro-alloy element.

* * * * *